US012681333B2

(12) United States Patent
Dubail et al.

(10) Patent No.: US 12,681,333 B2
(45) Date of Patent: Jul. 14, 2026

(54) FILTER AND A METHOD FOR DETERMINING A FILTER TAKING INTO ACCOUNT THE SPECTRAL TRANSMITTANCE OF AN OCULAR MEDIA OF AN EYE OF A WEARER

(71) Applicant: ESSILOR INTERNATIONAL, Charenton-le-Pont (FR)

(72) Inventors: Marie Dubail, Charenton-le-Pont (FR); Prakhar Kasture, Singapore (SG); Anne-Catherine Scherlen, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 650 days.

(21) Appl. No.: 17/928,572

(22) PCT Filed: May 27, 2021

(86) PCT No.: PCT/EP2021/064223
§ 371 (c)(1),
(2) Date: Nov. 29, 2022

(87) PCT Pub. No.: WO2021/239887
PCT Pub. Date: Dec. 2, 2021

(65) Prior Publication Data
US 2023/0213789 A1      Jul. 6, 2023

(30) Foreign Application Priority Data
May 29, 2020      (EP) ...................................... 20305563

(51) Int. Cl.
*G02C 7/10*      (2006.01)
*G02C 7/02*      (2006.01)

(52) U.S. Cl.
CPC ............. *G02C 7/104* (2013.01); *G02C 7/027* (2013.01)

(58) Field of Classification Search
CPC .... G02C 7/104; G02C 7/027; G02C 2202/10; G02C 2202/16; G02C 7/10; G02C 7/108; (Continued)

(56) References Cited

U.S. PATENT DOCUMENTS

| | | | |
|---|---|---|---|
| 3,826,751 A | | 7/1974 | Laliberte |
| 5,083,858 A | * | 1/1992 | Girerd .................... G02C 7/104 |
| | | | 351/44 |

(Continued)

FOREIGN PATENT DOCUMENTS

| | | |
|---|---|---|
| CN | 107111162 A | 8/2017 |
| CN | 108431677 A | 8/2018 |

(Continued)

OTHER PUBLICATIONS

Machine translation of JP-2008237492-A (Year: 2008).*

(Continued)

*Primary Examiner* — Matthew Y Lee
(74) *Attorney, Agent, or Firm* — NIXON & VANDERHYE

(57) ABSTRACT

Disclosed is a method for determining a filter for a visual equipment to be placed in front of the eye of a user to improve visual comfort and/or visual performance of the user, the method including: determining the spectral transmittance of an ocular media of an eye; and determining a filter based on the determined spectral transmittance of the ocular media so the filter has a spectral transmittance profile including: a first portion having a maximum transmittance value between 380 nm and a predetermined threshold, and a second portion with a decreasing transmittance value between the threshold and 670 nm. Also disclosed is a filter (Continued)

whose spectral transmittance is calculated based on the spectral transmittance of the user's ocular media, as well as a set of filters with each filter in the set having a spectral transmittance based on the spectral transmittance of the ocular media of users having different ages.

14 Claims, 2 Drawing Sheets

(58) Field of Classification Search
CPC ....... G02C 5/001; G02B 5/223; A61F 2/1613; A61F 2/1659
See application file for complete search history.

(56) References Cited

U.S. PATENT DOCUMENTS

| | | | | |
|---|---|---|---|---|
| 5,592,245 A * | 1/1997 | Moore | ................... | G02C 7/104 |
| | | | | 473/468 |
| 2011/0202114 A1 * | 8/2011 | Kessel | ................... | G01N 21/49 |
| | | | | 607/88 |
| 2014/0211166 A1 | 7/2014 | Scherlen et al. | | |
| 2015/0015844 A1 * | 1/2015 | Gallas | ................... | G02C 7/108 |
| | | | | 351/159.65 |
| 2017/0371179 A1 * | 12/2017 | Scherlen | ................ | G02C 7/027 |

| | | | | |
|---|---|---|---|---|
| 2019/0004223 A1 * | 1/2019 | Sanchez Ramos | ...... | G09G 3/00 |
| 2019/0212581 A1 * | 7/2019 | Scherlen | ................ | G02C 7/101 |
| 2019/0212582 A1 * | 7/2019 | Gallas | ................... | G02C 7/104 |
| 2019/0258086 A1 | 8/2019 | Barrau et al. | | |
| 2019/0258087 A1 * | 8/2019 | Valentine | ............... | G02C 7/107 |

FOREIGN PATENT DOCUMENTS

| | | | |
|---|---|---|---|
| EP | 0 608 202 | | 7/1994 |
| JP | 2008237492 A | * | 10/2008 |
| JP | 5097925 | | 12/2012 |

OTHER PUBLICATIONS

Dirk V. Norren, et al., "Spectral transmission of the human ocular media", Vision Research, Elsevier, vol. 14, No. 11, Nov. 1, 1974, pp. 1237-1244 (8 pages).
Extended European Search Report for EP Application No. 20305563.7 dated Nov. 13, 2020, 11 pages.
International Search Report for PCT/EP2021/064223 dated Jul. 26, 2021, 4 pages.
Written Opinion of the ISA for PCT/EP2021/064223 dated Jul. 26, 2021, 8 pages.
Office Action, issued in Chinese Patent Application No. 202180037384.2 dated Mar. 10, 2025.

* cited by examiner

- Lens for 60 years old Equivalent of 80%
- Lens for 60 years old Equivalent of 40%

-●- 40% -●- 80% -●- 40% -●- 80%

FILTER AND A METHOD FOR DETERMINING A FILTER TAKING INTO ACCOUNT THE SPECTRAL TRANSMITTANCE OF AN OCULAR MEDIA OF AN EYE OF A WEARER

CROSS-REFERENCE TO RELATED APPLICATIONS

This application is the U.S. national phase of International Application No. PCT/EP2021/064223 filed May 27, 2021 which designated the U.S. and claims priority to EP patent application No. 20305563.7 filed May 29, 2020, the entire contents of each of which are hereby incorporated by reference.

FIELD OF THE INVENTION

The present invention relates to the manufacturing of visual equipments, for example ophthalmic lenses.

More particularly, the invention relates to method for determining at least one filter for a visual equipment intended to be placed in front of the eye of a user.

BACKGROUND OF THE INVENTION

Sunglasses are often used for comfort and protection, although they can impair visual perception when the environment is not sufficiently bright. With age, crystalline lens gets darker, turns yellow and cataract may appear. Global and spectral transmission of the ocular media evolves. The ocular media is the transparent substances of the eye and comprises the cornea, the aqueous humour, the crystalline lens and the vitreous humour.

FIG. 1 shows a graph of the total transmittance of the clear ocular media of the aging human eye depending on the wavelength. It appears from the graph that transmittance of the ocular media decreases in shortest wavelengths (<525 nm) whereas sensitivity remains for long wavelengths (>600 nm) [CIE 203 2012—Transmittance data reaching the retina for a healthy ageing eye].

Added to the decrease of sensitivity of the photoreceptors and of transmission by the ganglion cells, it results in differences of light sensitivity, of visual performances and differences in comfort or discomfort towards light between wearers of different age. For seniors, wearing unadapted sunlenses may impair their visual performances.

Besides, color adaptation to the yellow color of the crystalline lens progressively occurs [Delahunt, Webster, Ma, Werner, Long-term renormalization of chromatic mechanisms following cataract surgery, Visual Neuroscience, 2004], and the effect will be reversed after cataract surgery. If the first distortion of color vision is progressive, the latter is brutal and may be disturbing.

To date, sunlenses or filters do not take into account lens opacification appearing with age either in generic or individual manner. Indeed, measurement of the ocular media is complex.

Thus, there is a need for a filter able to take into account the specificity of the ocular media of a user, notably with age, to improve his visual perception.

SUMMARY OF THE INVENTION

To that end, the invention provides a method for determining at least one filter for a visual equipment intended to be placed in front of the eye of a user, said at least one filter being able to improve visual comfort and/or visual performance of said user, the method comprising the following steps:

- determining the spectral transmittance of an ocular media of at least one eye of said user; and
- determining at least one filter based on the determined spectral transmittance of the ocular media of said user such that said filter has a spectral transmittance profile comprising:
  - a first portion having a maximum transmittance value between 380 nm and a predetermined wavelength threshold,
  - a second portion with a decreasing transmittance value between said predetermined wavelength threshold and 670 nm.

Determining a filter based on the spectral transmittance of the ocular media allows to closely adapt the filtering function of the filter to the eye characteristics of the user. Particularly, it is possible to balance the spectral transmission over the visible range.

Said determined filter is able to take into account of the age of the user to increase comfort towards light without impairing vision. It is thus possible to produce similar light illumination for users having different ages, particularly for young and older wearers, with closer color vision.

Wearing lenses with this kind of improved filters before cataract surgery may reduce the time of rehabilitation to colors after the surgery which takes on average few months.

Furthermore, it allows to provide older people with sunlenses which are not too dark which would decrease visual performance.

Determining the spectral transmittance of the filter with a spectral transmittance profile having said first and second portions allows to compensate transmittance loss of the ocular media while maximizing light entrance into the user's eye and eye stimulation on a large wavelength range.

According to an embodiment of the determining method, said maximum transmittance value is between 70 and 100%.

According to an embodiment of the determining method, said second portion continuously decreases from said maximum transmittance value to a minimum target transmittance value, said minimum target transmittance value corresponding to a wavelength between 630 nm and 670 nm.

According to an embodiment of the determining method, it further comprises a step of determining a target transmittance value, said filter being determined such that said minimum transmittance value is between −10% and +10% of said target transmittance value. Preferably, said minimum transmittance value is between −5% and +5% of said target transmittance value.

According to an embodiment of the determining method, the spectral transmittance of the ocular media of said user is determined based on a measurement on said user. This measurement may be performed directly onto the eye of the user, i.e. in situ, or indirectly, e.g. from data corresponding to the user's eye. These data may for example comprise an image of the ocular media of the user.

According to an embodiment of the determining method, the spectral transmittance of the ocular media of said user is determined based on the age of said user. In doing so, no specific measurement is performed on the user to determine the spectral transmittance of the ocular media of his eyes. Indeed, the spectral transmittance is determined on the basis of generic data correlating spectral transmittance with age. For instance, data from FIG. 1 can be taken as a basis for determining the spectral transmittance of a user.

An example of such a determination may consist in first determining a global transmission of a lens for a reference age, for example for a 20-year old wearer. The specific transmission of the ocular media of a given wearer is then determined depending on this global reference transmission. Particularly, a lens matching the needs of the given wearer may be determined by dividing the reference transmission by the specific transmission of the ocular media for the age of the given wearer.

According to an embodiment of the determining method, the spectral transmittance of the ocular media of said user is determined based on a spectral transmission test.

According to an embodiment of the determining method, the spectral transmission test comprises a step of measurement of an absolute scotopic threshold. By "absolute scotopic threshold", we mean the lowest level of luminance or illuminance perceived by the wearer after dark adaptation.

According to an embodiment of the determining method, the spectral transmission test comprises a step of measurement of an absolute light discomfort. By "absolute light discomfort", we mean a level of luminance or illuminance perceived at a certain level of discomfort by the wearer (ex: just noticeable, unbearable, etc).

According to an embodiment of the determining method, the spectral transmission test comprises a step of equalizing the photopic luminance. By "photopic luminance", we mean a level of luminance within photopic domain (above the threshold of 1 cd/m$^2$, preferably 100 cd/m2).

According to an embodiment of the determining method, the ocular media of said user is the crystalline lens.

According to an embodiment of the determining method, a spectral transmittance of the filter is computed as follows:

$$T(\lambda,age)=T_{Ref}(\lambda)/T_{crystalline}(\lambda,age)$$

with $T(\lambda,age)=1$ for $T_{Ref}(\lambda)/T_{crystalline}(\lambda, age)>1$.

According to an embodiment of the determining method, said at least one filter is determined to have a variable spectral transmittance depending on the wavelength. It allows to closely adapt the filter to the distribution of the spectral transmittance of the ocular media of the user.

According to an embodiment, the determining method is a computer-implemented method. The invention also provides a computer program product comprising instructions for performing the method as described above. The computer program product is advantageously configured for executing the method according to the disclosure, in any of its execution modes.

The invention further provides a device comprising memory having recorded thereon the computer program as described above, the device optionally further comprising a processor and a graphical user interface coupled to the memory.

The invention also provides a filter for a visual equipment intended to be placed in front of the eye of a user, wherein the spectral transmittance of the filter is calculated based on the spectral transmittance of the ocular media of said user such that said filter has a spectral transmittance profile comprising:

a first portion having a maximum transmittance value between 380 nm and a predetermined wavelength threshold, a second portion with a decreasing transmittance value between said predetermined wavelength threshold and 670 nm.

This filter closely takes into account the results observed in FIG. 1, i.e. with age transmittance of the ocular media decreases in shortest wavelengths whereas sensitivity remains for long wavelengths [CIE 203 2012—Transmittance data reaching the retina for an healthy ageing eye]. We hence obtain a long wavelength cut filter, i.e. which transmits more shorter wavelength that long ones, to balance the highest sensitivity in longest wavelengths due to the yellowing of the crystalline lens.

According to an embodiment of the filter, said predetermined wavelength threshold is between 425 and 525 nm. This allows to obtain a filter which further fits the results observed in FIG. 1.

The invention further provides a set of filters for a visual equipment intended to be placed in from of the eye of a user, wherein each filter in the set has a spectral transmittance based on the spectral transmittance of the ocular media of users having different ages, the spectral transmittance of each filter of said set of filters being calculated such that said filter has a spectral transmittance profile comprising:

a first portion having a maximum transmittance value between 380 nm and a predetermined wavelength threshold, a second portion with a decreasing transmittance value between said predetermined wavelength threshold and 670 nm.

BRIEF DESCRIPTION OF THE DRAWINGS

For a more complete understanding of the description provided herein and the advantages thereof, reference is now made to the brief descriptions below, taken in connection with the accompanying drawings and detailed description, wherein like reference numerals represent like parts.

DETAILED DESCRIPTION OF EMBODIMENTS

Figure 1:
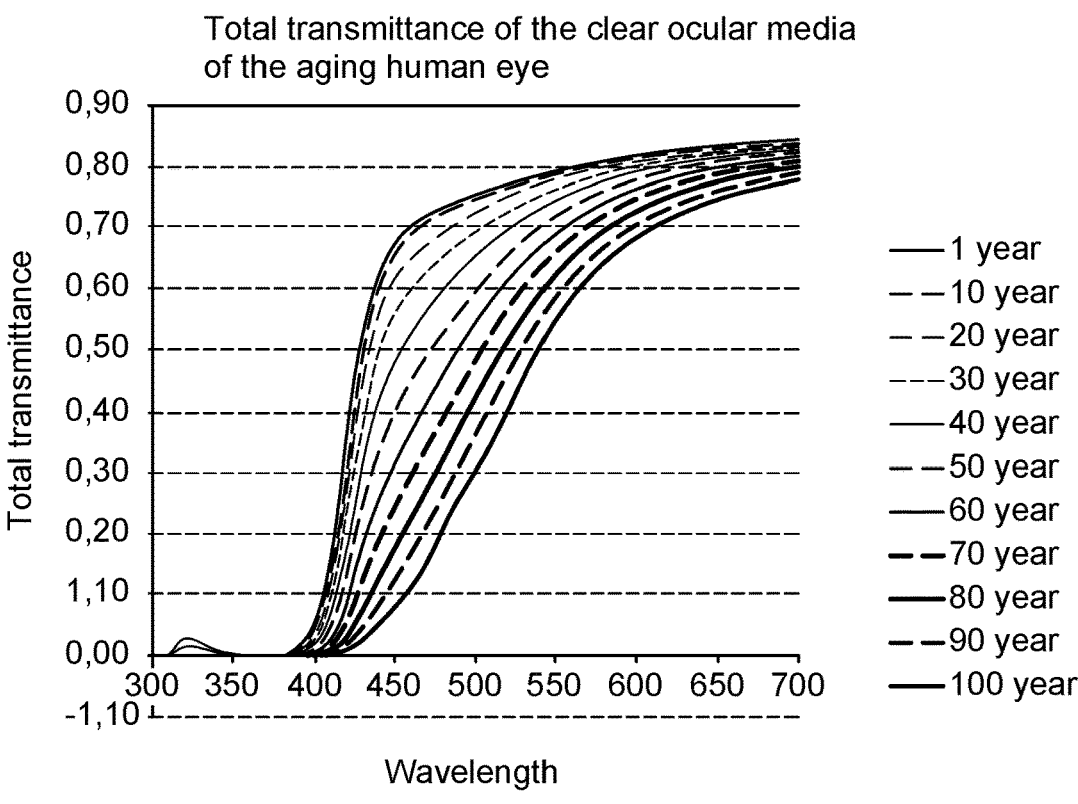
FIG. 1 is a graph illustrating the total transmittance of the clear ocular media of the aging human eye depending on the wavelength [from CIE 203 2012—Transmittance data reaching the retina for an healthy ageing eye].

In the description which follows, the drawing figures are not necessarily to scale and certain features may be shown in generalized or schematic form in the interest of clarity and conciseness or for informational purposes. In addition, although making and using various embodiments are discussed in detail below, it should be appreciated that as described herein are provided many inventive concepts that may embodied in a wide variety of contexts. Embodiments discussed herein are merely representative and do not limit the scope of the invention. It will also be obvious to one skilled in the art that all the technical features that are defined relative to a process can be transposed, individually or in combination, to a device and conversely, all the technical features relative to a device can be transposed, individually or in combination, to a process.

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises", "has", "contains", or "includes" one or more steps or elements possesses those one or more steps or elements but is not limited to possessing only those one or more steps or elements.

The claimed method allows to determine at least one filter for a visual equipment intended to be placed in front of the eye of a user.

The visual equipment may be an ophthalmic lens or pair of ophthalmic lenses, possibly active lenses, or a solar lens or pair of solar lenses, or an ophthalmic solar lens or pair of ophthalmic solar lenses. It may be in the form of glasses or contact lenses or intra-ocular lenses. For example, it may be a pair of progressive lenses. The solar lens may be of any class among 0, 1, 2, 3 or 4.

Said at least one filter is able to improve visual comfort and/or visual performance of said user.

A filter may be determined for each eye of an individual. In this case, said filters determined for each eye may be the same or different. Also said filters may even be chosen so as to provide a good compromise between both eyes of the individual.

The filter is determined by first determining the spectral transmittance of an ocular media of at least one eye of said user. The ocular media is the transparent substances of the eye and may comprise the cornea, the aqueous humour, the crystalline lens and the vitreous humour. Preferably, the ocular media of said user which is considered may be only the crystalline lens. The filter may be determined based on the spectral transmission of one or both of the eyes of a wearer.

The spectral transmission of the lens can be determined either from generic data (see for example FIG. 1 based on CIE curves of transmittance of the ocular media of the ageing eye) or from dedicated measurement (objective or psychovisual).

A filter is then determined based on the determined spectral transmittance of the ocular media of said user.

Said at least one filter may comprise a set of filters with each filter in the set having a spectral transmittance based on the spectral transmittance of the ocular media of users having different ages.

This determining method is detailed hereinafter.

As shown in FIG. 1, with age, less short wavelengths reach the retina, as they are absorbed by crystalline lens. Light sensitivity of older observers is therefore lower for shorter wavelengths. It results in different light comfort or discomfort according to the spectral nature of the light. This effect was shown in a study, which was conducted to evaluate the comfort towards light under different wavelengths.

Figure 2:
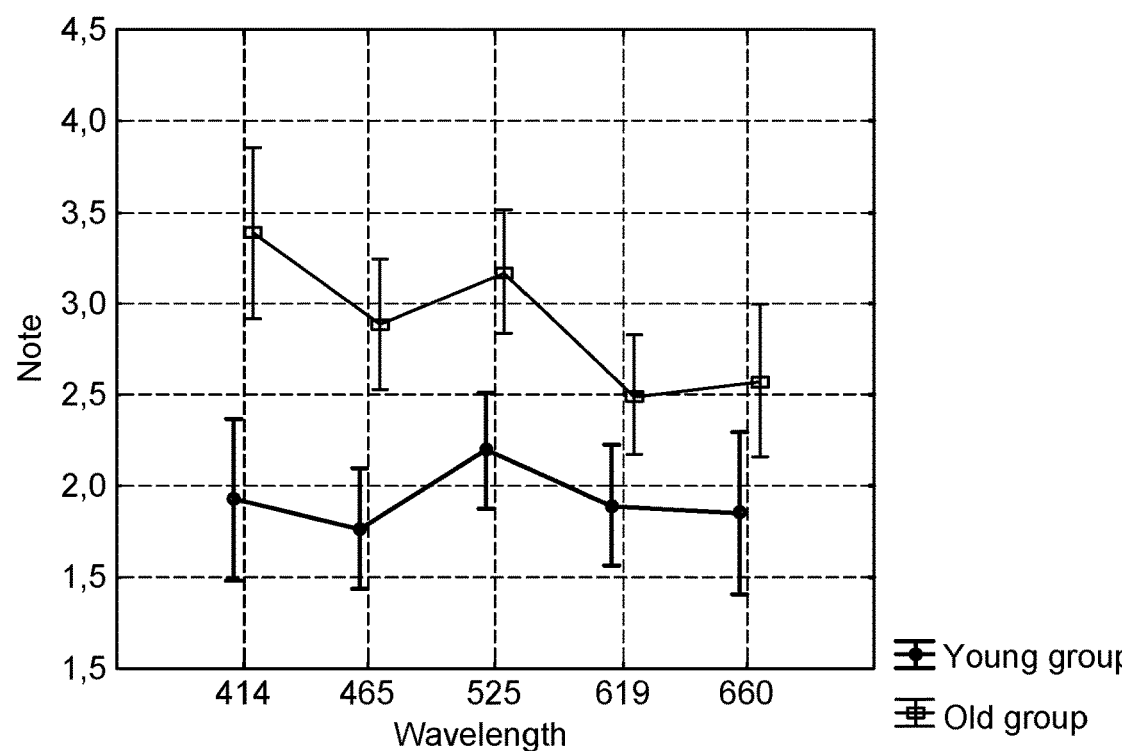
FIG. 2 is a graph illustrating the level of comfort or discomfort of groups having different ages depending on the dominant wavelength.

FIG. 2 shows the light sensitivity of first group of young observers 10 and a second group of old observers 20. Particularly, the graph of FIG. 2 shows the average note given by the observers of each group for different wavelength values. The higher the note between 0 to 5, the more comfortable is the light.

We can see on the graph that young people have lower absolute score (1.22 for young observers vs 3.10 for old observers) for all wavelength because of higher eyelens transmission. Indeed, since the spectral transmission of the ocular media is higher for the young observers, the discomfort is experienced as higher than for the old observers.

Furthermore, it appears that 619 and 660 nm wavelength values were judged less comfortable than lower wavelengths by older observers. Therefore, we can see that the decrease in the spectral transmission of the ocular media with age is not evenly distributed. It means that filtering long wavelengths could balance the comfort and produce same relative sensation as young people. The effect of a neutral filter on young adults could match the effect of a cyan filter on seniors. Therefore, a generic filter for seniors which decreases the transmission of wavelengths higher than 525 nm may be provided to increase comfort towards light.

Alternatively to a generic filter, it is possible to determine a specific filter for a given wearer.

A first embodiment is directed to determining the specific spectral transmittance of the ocular media of a wearer depending on a reference spectral transmittance of a reference wearer. This reference wearer is for example 20-year old.

The reference spectral transmittance of the ocular media of the reference wearer is first determined. This reference spectral transmittance may be determined based on the results of FIG. 1.

The transmitted light through a lens may be defined as follows:

$$T(\lambda, \text{age}) = T_{Ref}(\lambda)/T_{crystalline}(\lambda, \text{age}),$$

with $$T_{Ref}(\lambda)T_{lens}(\lambda) * T_{crystallineXyearsold}(\lambda)$$

with $T_{Ref}(\lambda)$ which is the spectral transmittance of the filter to be determined $T_{lens}(\lambda)$ which is the spectral transmittance of a given lens $T_{crystallineXyearsold}(\lambda)$ which is the reference spectral transmittance of the ocular media of the reference wearer of x years old $\lambda$ is the wavelength.

As an example, in case of a neutral 85% Tv lens having $T_{lens}(\lambda) = 0.85$ for a 20 years old reference:

$$T_{Ref}(\lambda) = 0.85 * T_{crystalline20yearsold}(\lambda)$$

Figure 3:
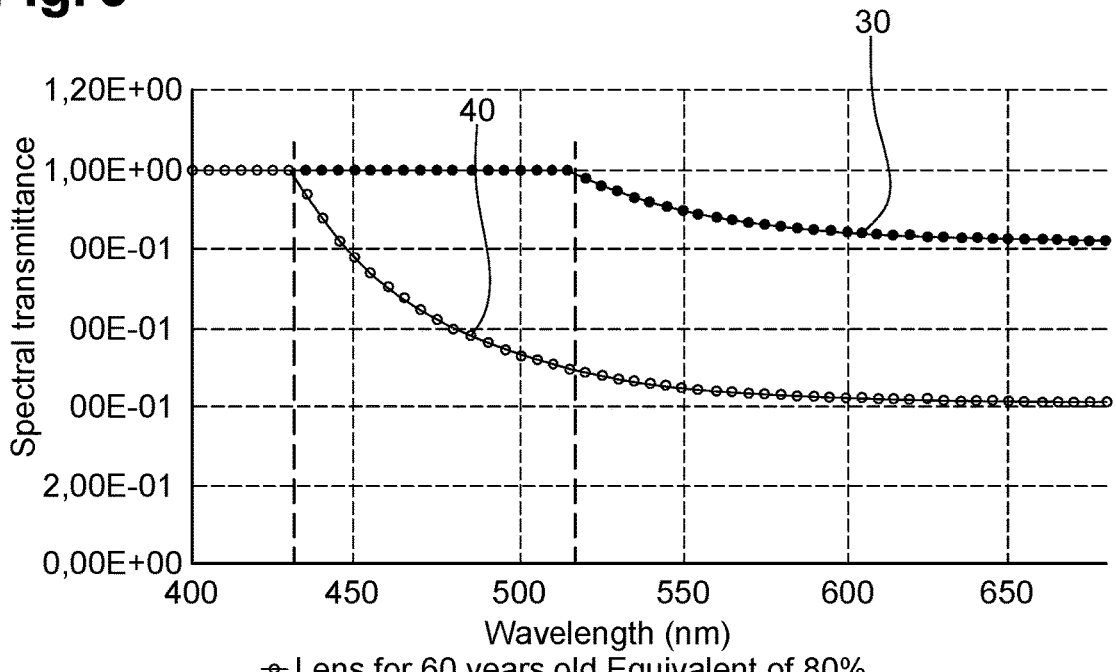
FIG. 3 is a graph illustrating a theorical spectral transmittance distribution of different lenses depending on the wavelength.

For older wearer, we can calculate a lens as, for $\lambda$ [380;700] nm:

$$T(\lambda, \text{age}) = T_{Ref}(\lambda)/T_{crystalline}(\lambda, \text{age})$$

with $T(\lambda, \text{age}) = 1$ for $T_{Ref}(\lambda)/T_{crystalline}(\lambda, \text{age}) > 1$ This mathematic relation is illustrated on FIG. 3 with a first 30 and a second 40 lenses for a 60-year old wearer with a $T_{lens}(\lambda)$ of 80% and 40%. These graphs show the spectral transmittance depending on the wavelength.

We can see that the filter is determined to have a non-even distribution of the spectral transmission in the visible spectral range. Particularly, short wavelength values are less filtered to fit the higher decrease of the ocular media transmittance in shortest wavelengths (<525 nm).

Each of first 30 and second 40 lenses have a corresponding spectral transmittance profile defining a first and a second portions. First lens 30 defines a first 32 and second 34 portions. Second lens 40 defines a first 42 and second 44 portions.

Said first portion has a maximum transmittance value between 380 nm and a predetermined wavelength threshold. Said second portion has a decreasing transmittance value between said predetermined wavelength threshold and 670 nm. In other words, said spectral transmittance profile has a generally decreasing profile from 380 nm to 670 nm.

Said second portion preferably has a continuously decreasing transmittance value. We may consider a variation of the transmittance value in this decreasing portion of 20%, most preferably 10%. In other words, said second portion may locally increase in a short wavelength range, e.g. 50 nm, but globally decreases between said predetermined wavelength threshold and 670 nm.

Said spectral transmittance profile is defined such that said second portion continuously decreases from said maximum transmittance value to a minimum target transmittance value. Said minimum target transmittance value is positioned at a wavelength between 630 nm and 670 nm. Said spectral transmittance profile therefore essentially decreases from a maximum spectral transmittance value to a minimum transmittance value from 380 nm to 670 nm, with an allowable local deviation of 20%, most preferably 10%.

Said maximum transmittance value is preferably between 70 and 100%.

A target transmittance value may also be determined to build-up a theorical spectral transmittance profile as illustrated on FIG. 3. Said target transmittance value corresponds to a theorical minimum spectral transmittance value at a wavelength between 630 nm and 670 nm. Said minimum transmittance value is between −10% and +10% of said target transmittance value, most preferably between −5% and +5% of said target transmittance value.

For example, said first 30 and second 40 lenses respectively have a target transmittance value of 80% and 40%.

Said predetermined wavelength threshold is determined depending on the target transmittance value for the filter. For the first lens 30, said predetermined wavelength threshold is approximately 525 nm. For the second lens 40, said predetermined wavelength threshold is approximately 425 nm.

Figure 4:
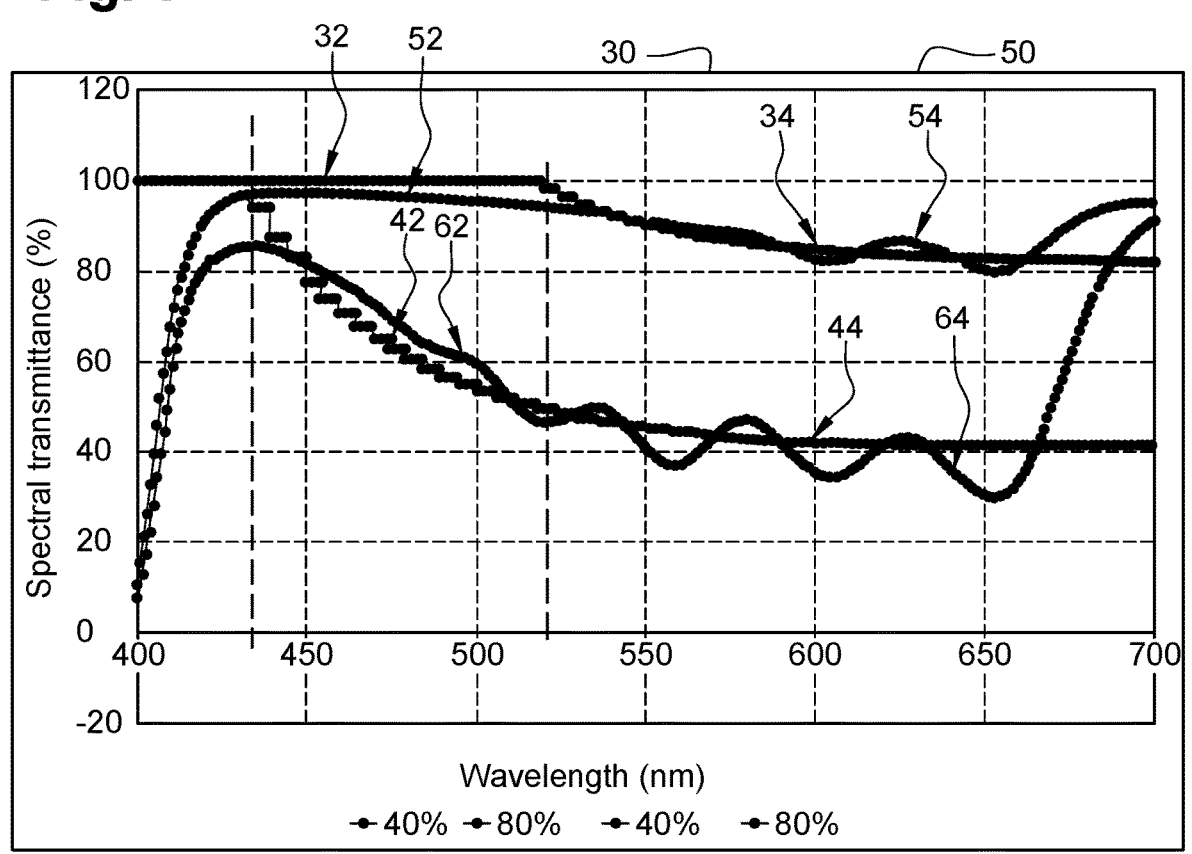
FIG. 4 is a graph illustrating theorical spectral transmittance distributions and corresponding calculated spectral transmittance distributions of different lenses depending on the wavelength.

FIG. 4 shows the theorical or target spectral transmittance profiles 30 and 40 of the filters of FIG. 3 with their corresponding calculated or actual spectral transmittance profiles 50 and 60. Calculated spectral transmittance profile 50 of the first lens 30 defines a first 52 and a second 54 portions. Calculated spectral transmittance profile 60 of the second lens 40 defines a first 62 and a second 64 portions.

According to a preferred embodiment, spectral transmittance variation between theorical spectral transmittance profile and calculated spectral transmittance profile is lower or equal to 30% in the first portion and lower or equal to 10% in the second portion.

Alternatively, it is possible to use different formula for $T(\lambda, age)$ that allow to have eyelens loss of transmission compensated for a larger range of wavelength (but detrimental in term of global transmission):

$$T(\lambda,age)=a \cdot T_{Ref}(\lambda)/T_{crystalline}(\lambda,age)$$

with $a<1$ $$T(\lambda,age)=1 \text{ for } a \cdot T\text{Ref}(\lambda)/T\text{crystalline}(\lambda,age)>1$$

This alternative formula allows to shift the abrupt transition (T=1) toward short wavelengths.

A second embodiment is directed to determining the specific spectral transmittance of the ocular media of a wearer depending on measurement. A specific lens can be prescribed to each individual wearer with a personalized measurement of the spectral transmission of the lens.

The spectral transmission of a filter may be determined based on a psychovisual experiment designed to balance the light sensitivity across the visible range.

The specific spectral transmission of the wearer may be obtained by measuring the absolute scotopic threshold and the absolute light comfort or discomfort for several wavelengths (at least at 400, 500 and 600 nm, ideally every 50 nm) or with a photopic luminance equalizer according to wavelength (at least between 400, 500 and 600 nm).

A psychovisual experiment using the measurement of the absolute scotopic threshold may comprise the following steps:

provide a controlled and uniform illumination, with increasing illuminance or luminance (e.g. from 10-8 cd/m² to 1 cd/m²), providing a controlled light spectrum, e.g. with colored LED or with selective filters coupled to a white light source, illuminating the wearer with the controlled, uniform illumination having a controlled light spectrum, the wearer is asked to signal the moment where he's able to perceive the stimulus, the experience may be repeated for several dominant wavelengths (e.g. at least at 400, 500 and 600 nm, ideally every 25 nm).

A psychovisual experiment using the measurement of the absolute light discomfort may comprise the following steps:

providing a controlled and uniform illumination, with increasing illuminance or luminance (e.g. from 1 cd/m² to 500 cd/m²), providing a controlled light spectrum, e.g. with colored LED or with selective filters coupled to a white light source, illuminating the wearer with the controlled, uniform illumination having a controlled light spectrum, the wearer is asked to rate his discomfort towards light for each stimulation, the experience may be repeated for several dominant wavelengths (e.g. at least at 400, 500 and 600 nm, ideally every 25 nm).

A psychovisual experiment using the measurement of the absolute light discomfort may comprise the following steps:

providing a controlled and uniform illumination, alternating between two different spectra (or different dominant wavelengths), illuminating the wearer with the controlled, uniform illumination, the wearer is asked to adjust the luminance of the first stimulus in order to balance the luminance of the different spectra (colors). The starting point of luminance may be around 100 cd/m², the experience may be repeated for several dominant wavelengths (e.g. at least at 400, 500 and 600 nm, ideally every 25 nm).

These measurements may be reproduced with different eccentricities within the visual field. The results would be taken into account to produce lens with gradient filtering function. The spatial transmission of the lens may be defined to vary according to the spatial transmission of the ocular media.

For aesthetics purpose, wearers may prefer a grey lens. Color balancing can be performed to improve the aesthetics of the lens while keeping the spectral transmission distribution determined with the claimed method.

To manufacture the lens with the determined filter, dye with specific absorption in red light of spectrum may be used keeping transmission as high as possible below 550 nm (blue range of the spectrum). Besides, the dye used has preferably low haze and a better selectivity as well as being compatible with the manufacturing process of the lens. A low haze is under 1%, preferably under 0.5%. Process compatibility refers to the absence of degradation after thermal curing or processing (molding/tinting). The selectivity refers to one absorption peak (lambda max) in the visible range from 650 to 680 nm, with FWHM>75 nm.

In a particular embodiment, the method according to the invention is computer-implemented. Namely, a computer program product comprises one or more sequences of instructions that are accessible to a processor and that, when executed by the processor, cause the processor to carry out steps of the method for determining the spectral transmittance of an ocular media of at least one eye of said user as well as determining at least one filter as described above.

The sequence(s) of instructions may be stored in one or several computer-readable storage medium/media, including a predetermined location in a cloud.

Although representative methods and devices have been described in detail herein, those skilled in the art will recognize that various substitutions and modifications may be made without departing from the scope of what is described and defined by the appended claims.

The invention claimed is:

1. A method for determining at least one filter for a visual equipment intended to be placed in front of the eye of a user, said at least one filter being able to improve visual comfort and/or visual performance of said user, the method comprising the following steps:

determining a spectral transmittance of an ocular media of at least one eye of said user, based on a measurement on said user or based on the age of said user;

determining a target transmittance value for at least one filter corresponding to a filtering function of said at least one filter;

determining said at least one filter based on the determined spectral transmittance of the ocular media of said user, said at least one filter having a spectral transmittance computed as follows:

$$T(\lambda,\text{age})=T\text{Ref}(\lambda)/T\text{crystalline}(\lambda,\text{age})\text{ for}$$

$$T\text{Ref}(\lambda)/T\text{crystalline}(\lambda,\text{age})<1,$$

and $$T(\lambda,\text{age})=1\text{ for }T\text{Ref}(\lambda)/T\text{crystalline}(\lambda,\text{age})>1$$

wherein $T\text{Ref}(\lambda)=T\text{lens}(\lambda)*T\text{crystallineXyearsold}(\lambda)$,
with $T\text{lens}(\lambda)$ the target transmittance value of the filter,
$T\text{crystallineXyearsold}(\lambda)$ is the spectral transmittance of the ocular media of the user of X years old,
$T\text{Ref}(\lambda)$ which is the spectral transmittance of the filter,
$\lambda$ is the wavelength, and
    such that said filter has a spectral transmittance profile comprising:
      a first portion having a maximum transmittance value between 380 nm and a predetermined wavelength threshold, said predetermined wavelength threshold is between 425 and 525 nm,
      a second portion with a decreasing transmittance value between said predetermined wavelength threshold and 670 nm, said second portion continuously decreasing from said maximum transmittance value to a minimum transmittance value, said minimum transmittance value corresponding to a wavelength between 630 nm and 670 nm, said minimum transmittance value is between −10% and +10% of said target transmittance value; and incorporating the at least one filter into the visual equipment intended to be placed in front of the eye of the user.

2. The method according to claim 1, wherein said maximum transmittance value is between 70 and 100%.

3. The method according to claim 2, wherein the spectral transmittance of the ocular media of said user is determined based on a measurement on said user.

4. The method according to claim 2, wherein the spectral transmittance of the ocular media of said user is determined based on the age of said user.

5. The method according to claim 1, wherein the spectral transmittance of the ocular media of said user is determined based on a measurement on said user.

6. The method according to claim 1, wherein the spectral transmittance of the ocular media of said user is determined based on the age of said user.

7. The method according to claim 1, wherein the spectral transmittance of the ocular media of said user is determined based on a spectral transmission test.

8. The method according to claim 7, wherein the spectral transmission test comprises a step of measurement of an absolute scotopic threshold.

9. The method according to claim 7, wherein the spectral transmission test comprises a step of measurement of an absolute light discomfort.

10. The method according to claim 7, wherein the spectral transmission test comprises a step of equalizing the photopic luminance.

11. The method according to claim 1, wherein the ocular media of said user is the crystalline lens.

12. The method according to claim 1, wherein a spectral transmittance of the filter is computed as follows:

$$T(\lambda,\text{age})=T_{Ref}(\lambda)/T\text{crystalline}(\lambda,\text{age})$$

with $T(A,\text{age})=1$ for $T\text{Ref}(\lambda)/T\text{crystalline}(\lambda,\text{age})>1$.

13. A filter for a visual equipment intended to be placed in front of the eye of a user, wherein a spectral transmittance of the filter is calculated based on a spectral transmittance of an ocular media of said user, said filter having a spectral transmittance computed as follows:

$$T(\lambda,\text{age})=T\text{Ref}(\lambda)/T\text{crystalline}(\lambda,\text{age})\text{ for}$$

$$T\text{Ref}(\lambda)/T\text{crystalline}(\lambda,\text{age})<1,$$

and $$T(\lambda,\text{age})=1\text{ for }T\text{Ref}(\lambda)/T\text{crystalline}(\lambda,\text{age})>1$$

wherein $T\text{Ref}(\lambda)=T\text{lens}(\lambda)*T\text{crystallineXyearsold}(\lambda)$,
with $T\text{lens}(\lambda)$ the target transmittance value of the filter,
$T\text{crystallineXyearsold}(\lambda)$ is the spectral transmittance of the ocular media of the user of X years old,
$T\text{Ref}(\lambda)$ which is the spectral transmittance of the filter,
$\lambda$ is the wavelength, and
    such that said filter has a spectral transmittance profile comprising:
      a first portion having a maximum transmittance value between 380 nm and a predetermined wavelength threshold, said predetermined wavelength threshold is between 425 and 525 nm,
      a second portion with a decreasing transmittance value between said predetermined wavelength threshold and 670 nm, said second portion continuously decreasing from said maximum transmittance value to a minimum transmittance value, said minimum transmittance value corresponding to a wavelength between 630 nm and 670 nm, said minimum transmittance value is between-10% and +10% of said target transmittance value.

14. A set of filters for a visual equipment intended to be placed in from of the eye of a user, wherein each filter in the set has a spectral transmittance based on a spectral transmittance of an ocular media f users having different ages, the spectral transmittance of each filter of said set of filters being calculated such that each filter of the set of filters has a spectral transmittance computed as follows:

$$T(\lambda,\text{age})=T\text{Ref}(\lambda)/T\text{crystalline}(\lambda,\text{age})\text{for}$$

$$T\text{Ref}(\lambda)/T\text{crystalline}(\lambda,\text{age})<1,$$

and $$T(\lambda,\text{age})=1\text{for }T\text{Ref}(\lambda)/T\text{crystalline}(\lambda,\text{age})>1$$

wherein $T\text{Ref}(\lambda)=T\text{lens}(\lambda)*T\text{crystallineXyearsold}(\lambda)$, with $T\text{lens}(\lambda)$ the target transmittance value of the filter, $T\text{crystallineXyearsold}(\lambda)$ is the spectral transmittance of the ocular media of the user of X years old, $T\text{Ref}(\lambda)$ which is the spectral transmittance of the filter, $\lambda$ is the wavelength, and said filter has a spectral transmittance profile comprising:

a first portion having a maximum transmittance value between 380 nm and a predetermined wavelength threshold, said predetermined wavelength threshold is between 425 and 525 nm, a second portion with a decreasing transmittance value between said predetermined wavelength threshold and 670 nm, said second portion continuously decreasing from said maximum transmittance value to a minimum transmittance value, said minimum transmittance value corresponding to a wavelength between 630 nm and 670 nm, said minimum transmittance value is between $-10\%$ and +10% of said target transmittance value.

* * * * *